(12) United States Patent
Vandergrift, II

(10) Patent No.: US 8,336,865 B2
(45) Date of Patent: Dec. 25, 2012

(54) METHODS, SYSTEMS, AND PRODUCTS FOR WELDING GROUNDING RODS

(75) Inventor: John Thomas Vandergrift, II, Jacksonville, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 467 days.

(21) Appl. No.: 12/624,433

(22) Filed: Nov. 24, 2009

(65) Prior Publication Data
US 2011/0121501 A1    May 26, 2011

(51) Int. Cl.
*B25B 5/00*    (2006.01)
(52) U.S. Cl. .............. 269/86; 269/16; 269/95; 174/6
(58) Field of Classification Search .............. 174/5 R, 174/5 SG, 6, 7, 78; 211/203; 228/49.1, 49.6; 24/132, 132 R, 24, 454, 457, 489, 490, 492, 24/493, 495, 497, 498, 513, 517; 248/127, 248/151, 154, 163.1, 163.2, 164, 176.1, 177.1, 248/431, 432, 440, 451, 511, 518, 519, 523, 248/528–530, 534, 536, 62, 65, 73, 74.1, 248/74.2; 269/136–138, 16, 287, 288, 329, 269/45, 53, 54, 86, 87, 903, 909, 95; 29/281.1–281.4; 439/100, 101
See application file for complete search history.

(56) References Cited

U.S. PATENT DOCUMENTS

| | | | |
|---|---|---|---|
| 1,848,527 A | 3/1932 | Hickey | |
| 2,127,828 A * | 8/1938 | Milton | 269/200 |
| 2,387,154 A | 10/1945 | Kalwitz | |
| 2,824,536 A | 2/1958 | Gamble | |
| 2,887,974 A | 5/1959 | Weinfeld | |
| 3,881,715 A | 5/1975 | Creek | |
| 4,533,102 A * | 8/1985 | Ferrell | 248/74.1 |
| 4,611,743 A | 9/1986 | Williams | |
| 5,040,716 A | 8/1991 | Stetz | |
| 5,573,229 A * | 11/1996 | Lycan | 269/49 |
| 5,660,317 A | 8/1997 | Singer et al. | |
| 5,715,886 A | 2/1998 | Fuchs | |
| 5,765,962 A * | 6/1998 | Cornell et al. | 403/396 |
| 5,797,580 A * | 8/1998 | Ryberg | 248/523 |
| 5,864,093 A * | 1/1999 | Hecock et al. | 174/78 |
| 5,954,261 A | 9/1999 | Gaman | |
| 6,357,735 B2 * | 3/2002 | Haverinen | 269/43 |
| 6,370,817 B1 * | 4/2002 | Brooks et al. | 47/43 |
| 6,398,596 B1 * | 6/2002 | Malin | 439/800 |
| 6,523,231 B1 * | 2/2003 | Lassiter | 24/339 |
| 6,648,318 B1 | 11/2003 | Oetlinger | |
| 6,651,967 B1 * | 11/2003 | Barber | 269/43 |
| 6,793,003 B2 | 9/2004 | Triantopoulos et al. | |
| 7,484,336 B2 * | 2/2009 | Stone | 52/156 |
| 2008/0108234 A1 * | 5/2008 | Clark et al. | 439/108 |
| 2008/0164046 A1 | 7/2008 | Duley | |

* cited by examiner

*Primary Examiner* — Lee D Wilson
*Assistant Examiner* — Tyrone V Hall, Jr.
(74) *Attorney, Agent, or Firm* — Scott P. Zimmerman PLLC

(57) ABSTRACT

Methods, systems, apparatuses, and products are disclosed for welding ground wires to a grounding rod. A jig retains the ground wires to the grounding rod. The jig has a first horseshoe oriented to a second horseshoe to form a crucifix. Each horseshoe has a pair of legs supporting the jig from earth and providing electrical ground to the earth. A central passage bisects each horseshoe through which the grounding rod inserts. Mechanisms are included for clamping a ground wire to at least one of the legs, such that the ground wire is retained for welding to the grounding rod.

20 Claims, 5 Drawing Sheets

METHODS, SYSTEMS, AND PRODUCTS FOR WELDING GROUNDING RODS

COPYRIGHT NOTIFICATION

A portion of the disclosure of this patent document and its attachments contain material which is subject to copyright protection. The copyright owner has no objection to the reproduction by anyone of the patent document or the patent disclosure, as it appears in the United States Patent and Trademark Office patent files or records, but otherwise reserves all copyrights whatsoever.

BACKGROUND

Exemplary embodiments generally relate to electrical conductors, to earth grounds, to metal working for assembly and disassembly, to clamping of work pieces, and to work piece holders.

An electrical connection to ground is safe. Telephone, electrical, and cable systems require an electrical connection to ground. The grounded electrical connection helps ensure safe usage.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
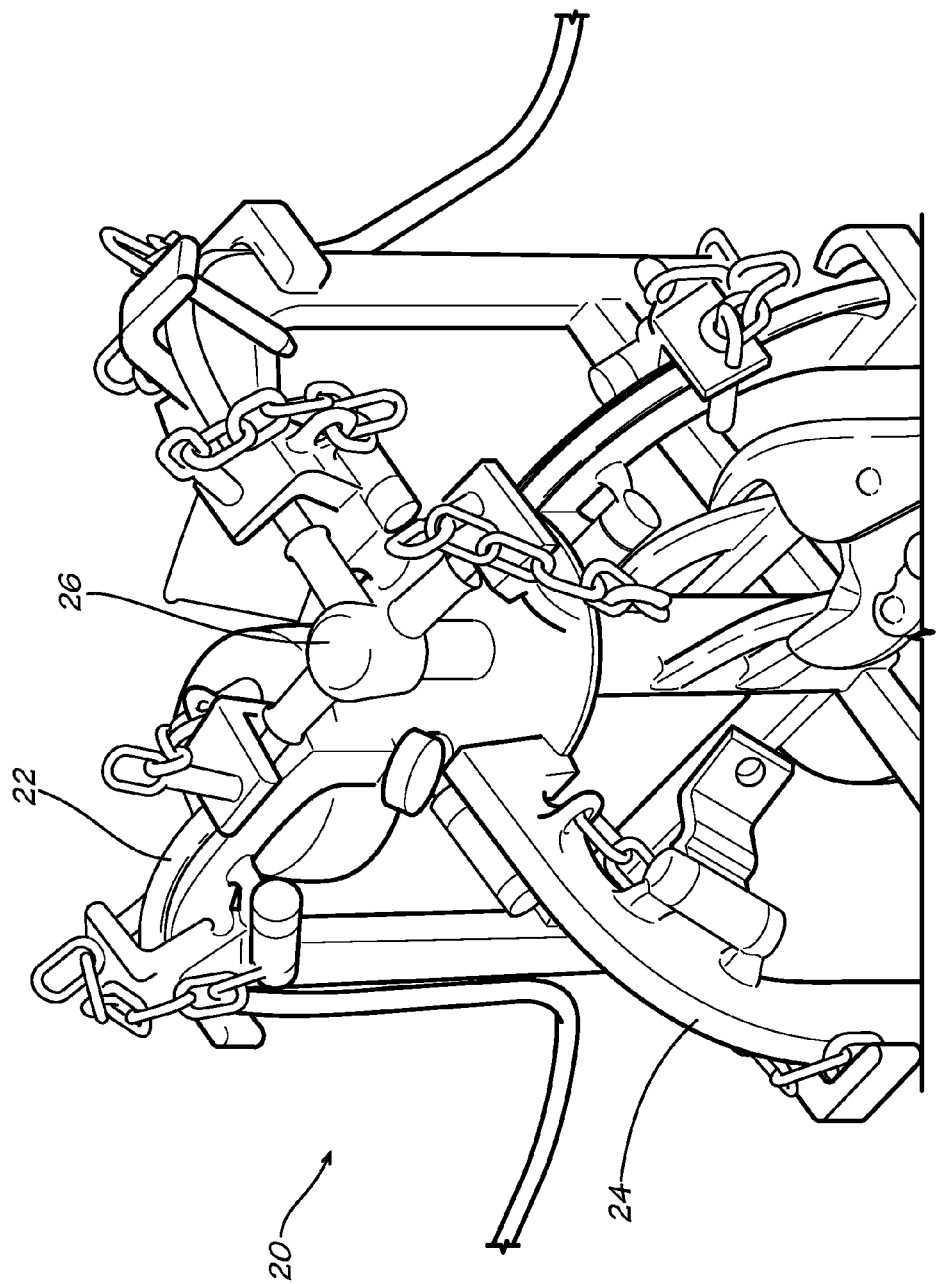
FIGS. 1 and 2 are schematics illustrating a welding jig, according to exemplary embodiments.
Figure 2:
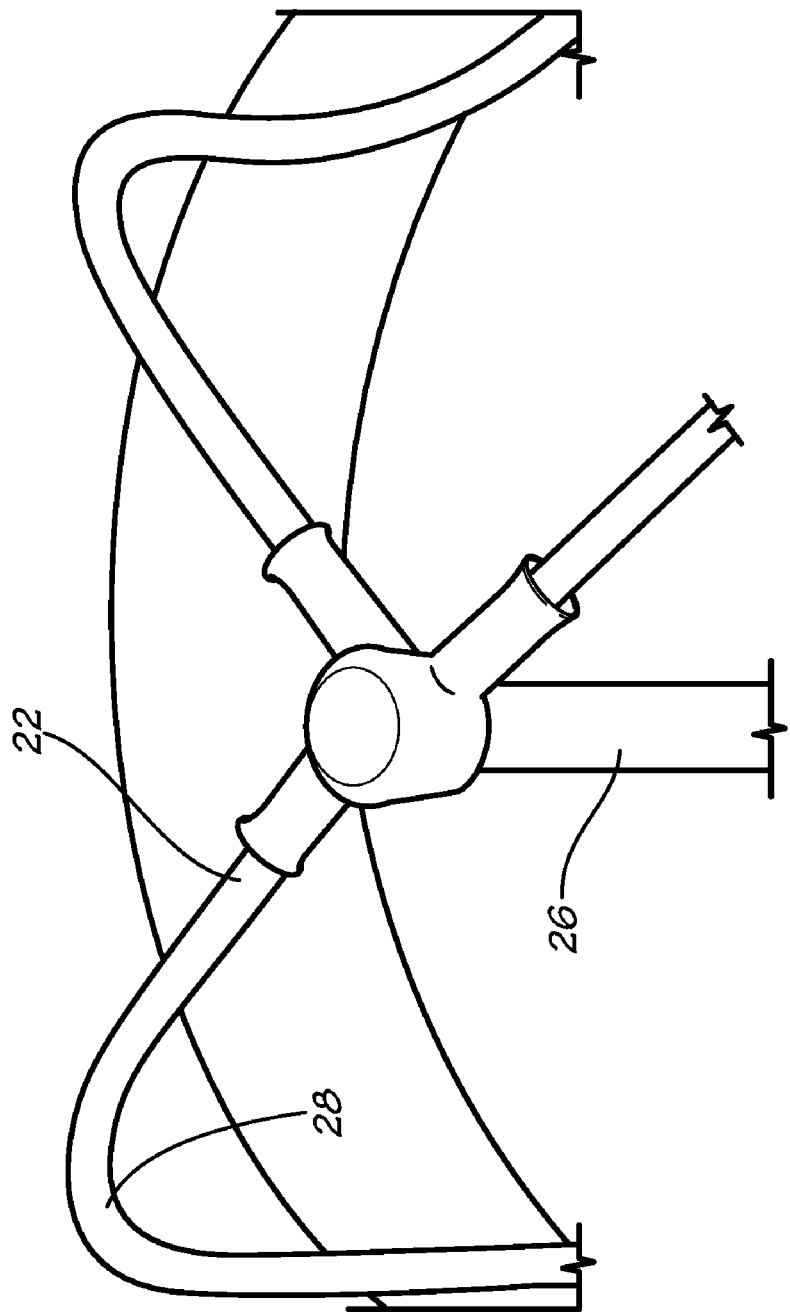

FIGS. 1 and 2 are schematics illustrating the exemplary embodiments. FIG. 1 illustrates a welding jig 20 that is designed to conform at least one ground wire 22 to a curvature of a leg 24 of the welding jig 20. After the ground wire 22 is welded to a grounding rod 26, the welding jig 20 may be removed. As FIG. 2 illustrates, the ground wire 22 retains the curvature of the leg 24, even though the welding jig 20 has been removed. The ground wire 22 is thus formed at a predetermined radius 28 of curvature to maintain an electrical connection to the grounding rod 26 and to earth.

Figure 3:
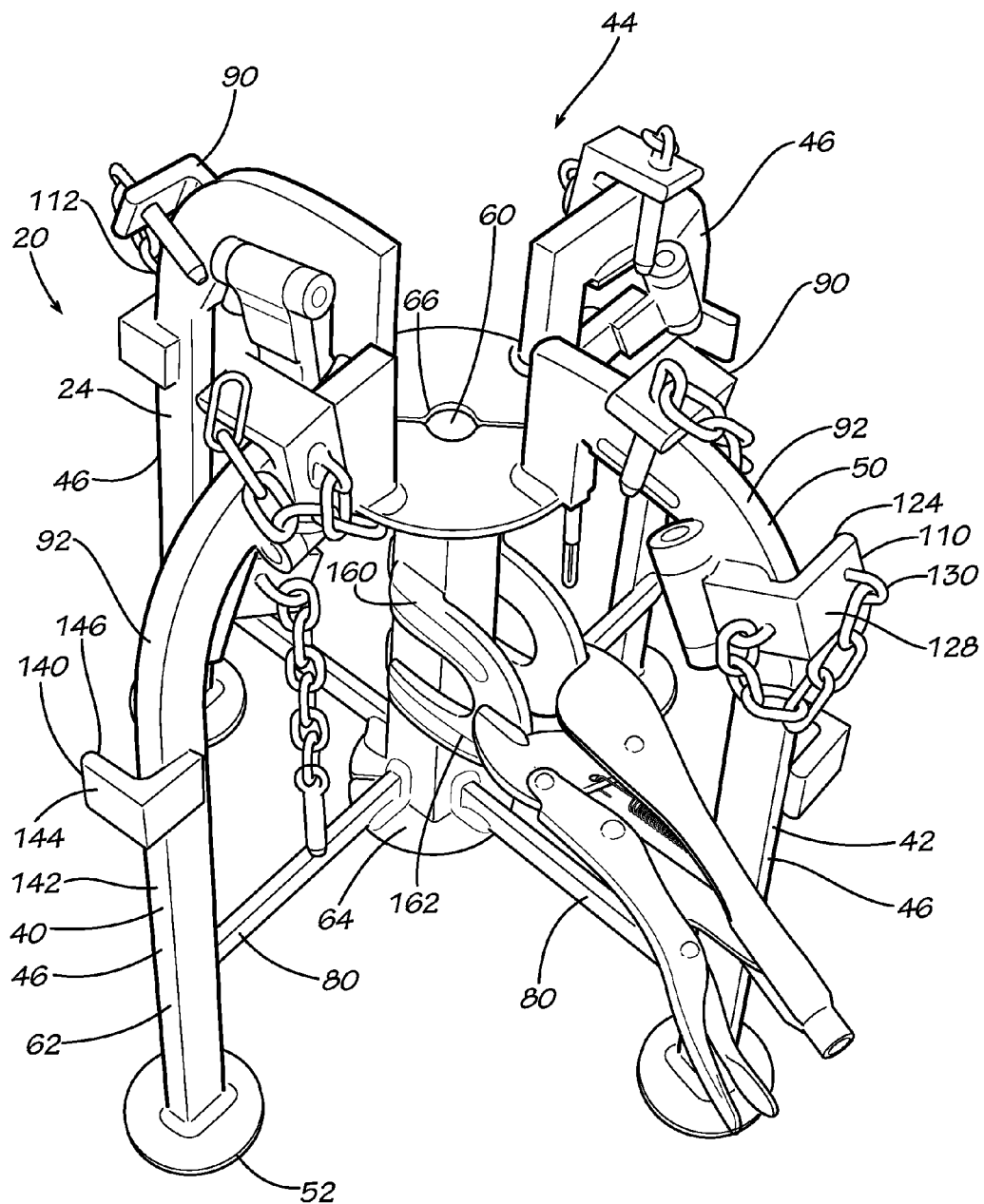
FIG. 3 is a more detailed schematic illustrating the welding jig, according to exemplary embodiments.
Figure 4:
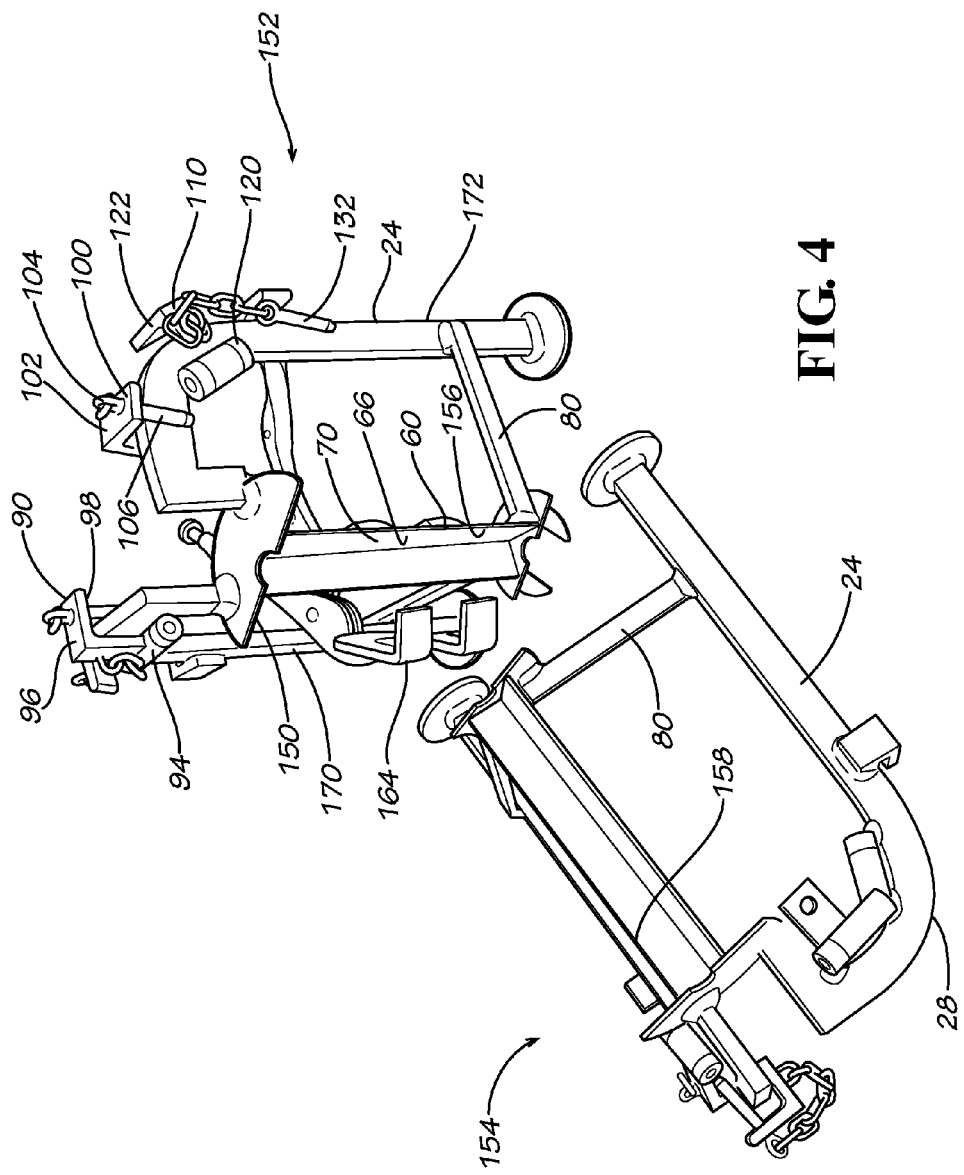
FIGS. 4 and 5 are schematics illustrating more details of the welding jig, according to exemplary embodiments.

FIGS. 3 and 4 are more detailed schematics illustrating the welding jig 20, according to exemplary embodiments. The welding jig 20 is formed from a pair of horseshoes. A first "U"-shaped horseshoe 40 and a second "U"-shaped horseshoe 42 are perpendicularly oriented to form a crucifix 44. Each horseshoe 40 and 42 has a pair 46 of legs. Each leg 24 downwardly extends from a knee region 50. Each leg 24 has a foot 52 that contacts the earth and maintains an electrical connection to earth ground. The horseshoes 40 and 42 are oriented in an upright position such that each foot 52 contacts the earth.

The welding jig 20 also has a hollow central passage 60. The central passage 60 bisects each horseshoe 40 and 42. The central passage 60 is substantially parallel to each downwardly extending portion 62 of each leg 24. The central passage 60 has an outer wall 64 and an inner wall 66 defining a longitudinal axis $L_P$. The inner wall 66 thus defines an open interior 70 along the longitudinal length of the central passage 60. The grounding rod 26 inserts into and through the central passage 60, and the grounding rod 26 is driven into the earth.

The horseshoes 40 and 42 may be braced to the central passage 60. Each leg 24 of each horseshoe 40 and 42 may be connected to the outer wall 64 of the central passage 60 by a transverse brace 80. The central passage 60 and the transverse brace 80 thus resemble a hub-and-spoke arrangement, with each transverse brace 80 radially and outwardly extending from the outer wall 64 of the central passage 60. Two transverse braces 80, for example, may connect each horseshoe 40 and 42 to the central passage 60. A first pair of transverse braces 80, for example, connect the central passage 60 to respective legs of the first horseshoe 40. A second pair of transverse braces 80 connect the central passage 60 to respective legs of the second horseshoe 42. The four (4) transverse braces 80 may also have a cruciform orientation.

The welding jig 20 may include means for clamping the ground wire 22. The ground wire 22 may be clamped to the leg 24, such that the ground wire 22 is retained during the welding operation. As FIG. 3 illustrates, the leg 24 may include a first hinged clamp 90 that retains the ground wire 22 to an outer edge 92 of the leg 24. A hinge 94 connects the first hinged clamp 90 to the leg 24. The first hinged clamp 90 includes an "L"-shaped arm 96 attached to the hinge 94 that pivots about the hinge 94 and swings away from the leg 24. The "L"-shaped arm 96 has an inner surface 98 that mechanically retains the ground wire 22 to the outer edge 92 of the leg 24. The "L"-shaped arm 96 may also have a hole or opening 100 bounded by a circular inner wall. The hole 100 extends through the "L"-shaped arm 96 from an outer surface 102 to the inner surface 98. A retaining pin 104 inserts into and through the hole or opening 100 to further retain the ground wire 22 to the outer edge 92 of the leg 24. A shank 106 of the retaining pin 104 laterally retains the ground wire 22 to the outer edge 92 of the leg 24.

The welding jig 20 may also include a second hinged clamp 110. The second hinged clamp 110 also retains the ground wire 22 to the outer edge 92 of the leg 24. The second hinged clamp 110, though, is located in a middle zone 112 of the knee region 50 of the leg 24. The second hinged clamp 110 retains the ground wire 22 as the ground wire 22 is bent along the outer edge 92 of the knee region 50. The curvature of the knee region 50 helps ensure the ground wire 22 survives voltage surges, such as those caused by localized lightening strikes. If the bend in the ground wire 22 is too severe (e.g., too concave), a voltage surge may cause a failure ("blow out") in the ground wire 22. The ground wire 22 is thus bent to conform to the radius 28 of curvature of the knee region 50, which may be about a three inch radius bend. A greater bend radius has been shown to cause failures. Technicians in the field may thus reliably and repeatedly install, bend, and weld ground wires to an optimum electrical configuration.

The second hinged clamp 110 is similar in construction and operation to the first hinged clamp 90. A hinge 120 connects the second hinged clamp 110 to the leg 24. The second hinged clamp 110 includes an "L"-shaped arm 122 attached to the hinge 94 that pivots about the hinge 94 and swings away from the leg 24. The "L"-shaped arm 122 has an inner surface 124 that mechanically retains the ground wire 22 to the outer edge 92 of the leg 24. The "L"-shaped arm 122 may also have a hole or opening extending through the "L"-shaped arm 122 from an outer surface 128 to the inner surface 124. A retaining pin 130 inserts into and through the hole or opening to further retain the ground wire 22 to the outer edge 92 of the knee region 50. A shank 132 of the retaining pin 130 laterally retains the ground wire 22 to the outer edge 92 of the knee region 50.

The welding jig 20 may also include a fixed clamp 140. The fixed clamp 140 again retains the ground wire 22 to the outer edge 92 of the leg 24. The fixed clamp 140, though, is located near an end 142 of the radius 28 of curvature of the knee region 50. The fixed clamp 140 includes a stationary "L"-shaped arm 144 attached to the leg 24. The "L"-shaped arm 144 has an inner surface 146 that mechanically retains the ground wire 22 to the outer edge 92 of the leg 24.

As FIG. 4 illustrates, the horseshoes 40 and 42 may be separable. The central passage 60 may have at least one seam 150 along which the welding jig 20 bifurcates into right 152 and left 154 halves. The at least one seam 150 runs along the longitudinal axis $L_P$ of the central passage 60. A first half 156 of the central passage 60 is affixed to one leg 24 of each horseshoe 40 and 42. A second half 158 of the central passage 60 is affixed to another leg 24 of each horseshoe 40 and 42. The at least one seam 150 separates each of the horseshoes 40 and 42 into bisected halves. The welding jig 20, then, may be separated into two separate fixtures, with each fixture comprising one leg 24 of the first horseshoe 40 and one leg of the second horseshoe 42.

The horseshoes 40 and 42 may be clamped together to form the crucifix 44. A pair 160 of opposing flanges outwardly extend from the outer wall 64 of the central passage 60. A first flange 162 outwardly extends from the first half 156 of the central passage 60, and a second flange 164 outwardly extends from the second half 158 of the central passage 60. The pair 160 of opposing flanges may be clamped together (such as with a VISE-GRIP® tool) to maintain the first horseshoe 40 and the second horseshoe 42 in the cruciform orientation during the weld operation.

As FIG. 4 also illustrates, the horseshoes 40 and 42 may bifurcate along the seam 150. The first half 156 of the central passage 60 may bisect the first horseshoe 40. A left leg 170 outwardly and radially extends from the outer wall 64 of the central passage 60. The left leg 170 has the knee region 50 with the radius 28 of curvature. The left leg 170 transitions along the knee region 50 to downwardly extend to the foot 52. Because the first half 156 of the central passage 60 may bisect the first horseshoe 40, a right leg 172 has a similar orientation. The right leg 172 outwardly and radially extends from the outer wall 64 of the central passage 60, and the right leg 172 transitions along a corresponding knee region 50 with the radius 28 of curvature. A pair of transverse braces 80 connect from the first half 156 of the central passage 60 to the respective left 170 and right 172 legs.

Figure 5:
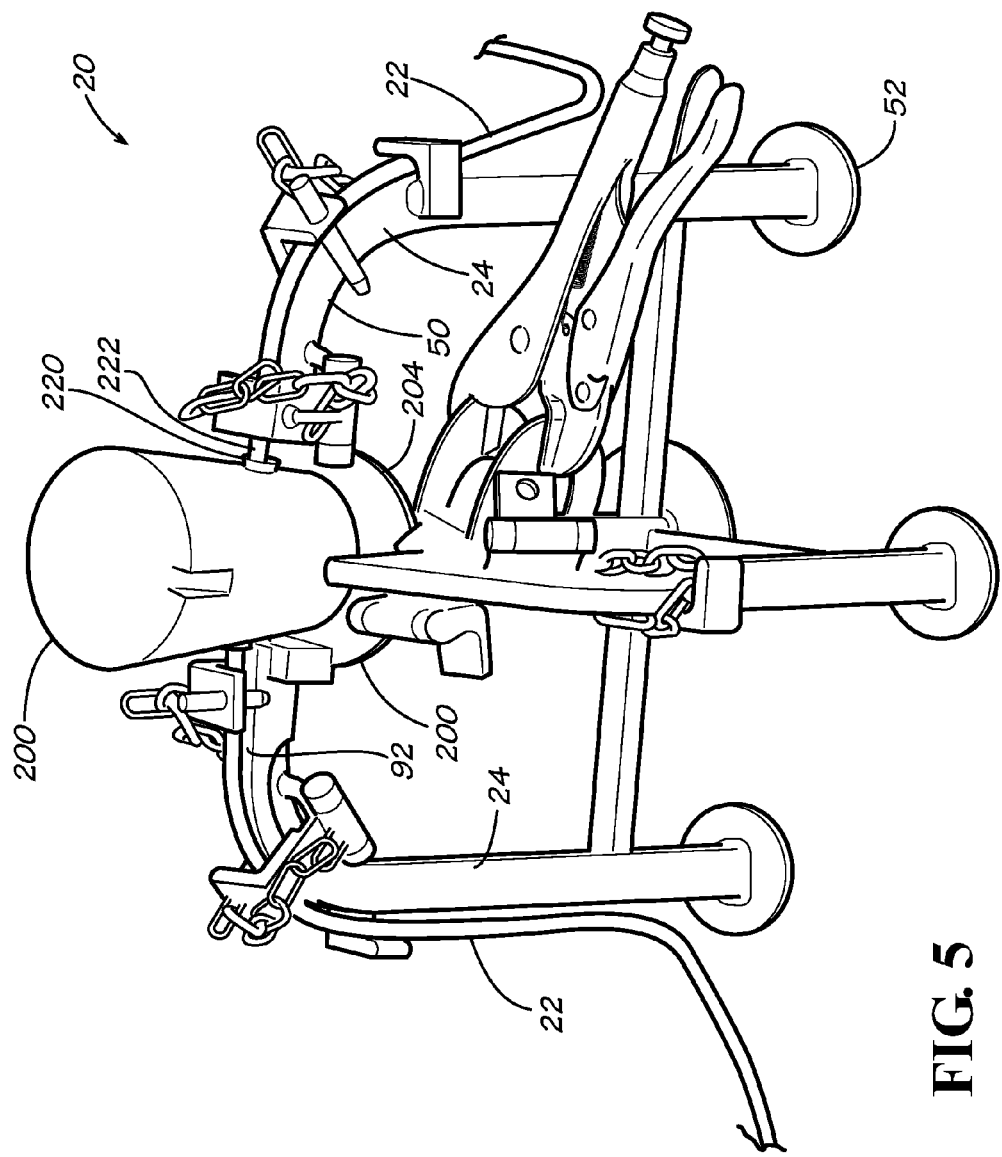

FIG. 5 is another schematic illustrating more details of the welding jig, according to exemplary embodiments. The welding jig 20 may also include a crucible mount 200. Because the ground wire 22 is exothermally welded, the welding jig 20 may include the crucible mount 200 for holding an exothermic weld mold 202. The crucible mount 200 has an outer edge 204, which is illustrated as having a circular shape. The crucible mount 200 may also have the inner wall (illustrated as reference numeral 66 in FIG. 3) that forms the opening that is aligned with the open interior 70 of the central passage 60. The at least one seam (illustrated as reference numeral 150 in FIG. 4) may extend through the crucible mount 200, such that the outer edge 204 and the inner wall 66 have a symmetrical cross section aligned with the longitudinal axis $L_P$ of the central passage 60. The grounding rod 26 inserts through the opening 208 in the crucible mount 200 and through the open interior 70 of the central passage 60. The exothermic weld mold 202 rests atop an upper surface of the crucible mount 200.

The ground wire 22 inserts into the exothermic weld mold 202. The exothermic weld mold 202 has a guide hole 220 aligned with each leg 24 of the first horseshoe 40. A technician inserts an end 222 of the ground wire 22 into the guide hole 220. The ground wire 22 is pushed through the guide hole 220 and into an internal weld chamber in the exothermic weld mold 202. The exothermic weld mold 202 is then ignited, and molten metal within the exothermic weld mold 202 drips onto the end 222 of the ground wire 22 and onto a tip of the grounding rod 26. The end 222 of the ground wire 22 is thus welded to the tip of the grounding rod 26, thus providing an electrical connection to electrical ground. Because exothermic welding and the exothermic weld mold 202 are well-known to those of ordinary skill in the art, no further details are needed. If the reader desires more details, the reader is invited to consult U.S. Pat. No. 3,020,608 to Gefland, U.S. Pat. No. 5,715,886 to Fuchs, and U.S. Pat. No. 6,793,003 to Triantopoulos, which are all incorporated herein by reference in their entirety.

The ground wire 22 may also be bent to the leg 24. The ground wire 22 may be bent before or after the exothermic welding operation. The ground wire 22 is bent to conform to the same shape as the outer edge 92 of the leg 24. The ground wire 22, for example, is routed along the outwardly and radially extending region of the left leg 24. At the knee region 50, the ground wire 22 is bent along the outer edge 92 of the knee region 50 to downwardly route toward the foot 52. The curvature of the knee region 50 helps ensure the ground wire survives voltage surges, such as those caused by localized lightening strikes. If the bend in the ground wire 22 is too severe (e.g., too concave), a voltage surge may cause a failure ("blow out") in the ground wire 22. The ground wire 22 is thus bent to conform to the curvature of the knee region 50, which may be about a three inch radius bend. A greater bend radius has been shown to cause failures. Technicians in the field may thus reliably and repeatedly install, bend, and weld ground wires to an optimum electrical configuration.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A jig for welding ground wires to a grounding rod, the jig comprising:
    a first horseshoe and a second horseshoe forming a crucifix, each horseshoe having a pair of legs supporting the jig from earth and providing electrical ground to the earth;
    a central passage bisecting each horseshoe through which the grounding rod inserts; and
    means for clamping a ground wire to at least one of the legs, such that the ground wire is retained for welding to the grounding rod.

2. The jig according to claim 1, further comprising a seam along a longitudinal axis of the central passage that separate the central passage into separate halves, with a first half affixed to the first horseshoe and a second half affixed to the second horseshoe.

3. The jig according to claim 2, further comprising a pair of opposing flanges outwardly extending from an exterior surface of the central passage, with a first flange attached to the first half and a second flange attached to the second half, such that the pair of opposing flanges may be clamped together to maintain the crucifix.

4. The jig according to claim 1, further comprising a crucible mount atop the central passageway.

5. The jig according to claim 4, further comprising an opening in the crucible mount to an open interior of the central passage.

6. The jig according to claim 1, further comprising at least one hinged clamp that retains the ground wire to a leg.

7. The jig according to claim 1, further comprising at least one hinged clamp that retains the ground wire to an outer edge of a leg.

8. A jig for welding ground wires to a grounding rod, the jig comprising:
    a first horseshoe clamped to a second horseshoe to form a crucifix, each horseshoe having a pair of legs supporting the jig from earth and providing electrical ground to the earth;
    a central passage bisecting each horseshoe, the central passage having a longitudinal inner wall through which the grounding rod inserts; and
    at least one clamp that bends a ground wire to a curvature of a leg such that the ground wire is retained along an outer edge of the leg and exothermically welded to the grounding rod.

9. The jig according to claim 8, further comprising a seam along a longitudinal axis of the central passage, the seam separating the central passage into separate halves, with a first half affixed to the first horseshoe and a second half affixed to the second horseshoe.

10. The jig according to claim 9, further comprising a pair of opposing flanges outwardly extending from an exterior surface of the central passage, with a first flange attached to the first half of the central passage and a second flange attached to the second half of the central passage, such that the pair of opposing flanges may be clamped together to maintain the first horseshoe and the second horseshoe in the crucifix.

11. The jig according to claim 8, further comprising a crucible mount atop the central passage.

12. The jig according to claim 11, further comprising a circular opening in the crucible mount through which the grounding rod inserts to an open interior of the central passage.

13. The jig according to claim 8, further comprising a transverse brace extending from the leg to an outer surface of the central passage.

14. The jig according to claim 8, further comprising a hinge connecting the at least one clamp to the leg to pivot the at least one clamp away from the leg.

15. A jig for welding ground wires to a grounding rod, the jig comprising:
    a first horseshoe oriented to a second horseshoe to form a crucifix, each horseshoe having a pair of legs supporting the jig from earth, with at least one of the legs having a predetermined radius of curvature to maintain electrical ground to the earth;
    a central passage bisecting each horseshoe, the central passage having a longitudinal inner wall through which the grounding rod inserts; and
    at least one clamp that bends a ground wire to the predetermined radius of curvature of a leg such that the ground wire is retained along an outer edge of the leg for welding to the grounding rod.

16. The jig according to claim 15, further comprising a seam along a longitudinal axis of the central passage, the seam separating the central passage into separate halves, with a first half affixed to the first horseshoe and separating from a second half affixed to the second horseshoe.

17. The jig according to claim 16, further comprising a pair of opposing flanges outwardly extending from an exterior surface of the central passage, with a first flange attached to the first half of the central passage and a second flange attached to the second half of the central passage, such that the pair of opposing flanges may be clamped together to maintain the first horseshoe and the second horseshoe in the crucifix.

18. The jig according to claim 15, further comprising a crucible mount atop the central passageway having a circular opening through which the grounding rod inserts to an open interior of the central passage.

19. The jig according to claim 15, further comprising a transverse brace extending from the leg to an outer surface of the central passage.

20. The jig according to claim 15, further comprising a hinge connecting the at least one clamp to the leg to pivot the at least one clamp away from the leg.

* * * * *